United States Patent [19]
Lee

[11] Patent Number: 5,301,026
[45] Date of Patent: Apr. 5, 1994

[54] PICTURE EDITING APPARATUS IN A DIGITAL STILL VIDEO CAMERA SYSTEM

[75] Inventor: Young-man Lee, Kyunggi, Rep. of Korea

[73] Assignee: SamSung Electronics Co., Ltd., Suwon, Rep. of Korea

[21] Appl. No.: 812,815

[22] Filed: Dec. 24, 1991

[30] Foreign Application Priority Data

Jan. 30, 1991 [KR] Rep. of Korea .............. 91-1586

[51] Int. Cl.$^5$ ............................................. H04N 5/262
[52] U.S. Cl. ........................... 348/584; 358/909.1; 358/906; 358/335; 348/231
[58] Field of Search ............ 358/183, 181, 182, 311, 358/319, 909, 148, 150, 310, 335, 906, 209; H04N 5/262, 5/272

[56] References Cited

U.S. PATENT DOCUMENTS

| | | | |
|---|---|---|---|
| 4,101,926 | 7/1978 | Dischert | 358/19 |
| 4,386,367 | 5/1983 | Peterson | 358/140 |
| 4,561,020 | 12/1985 | Matsuda | 358/183 |
| 4,713,693 | 12/1987 | Southworth | 358/22 |
| 4,797,751 | 1/1989 | Yamaguchi | 358/906 |
| 4,837,628 | 6/1989 | Sasaki | 358/909 |
| 4,939,593 | 7/1990 | Yuuchi | 358/909 |
| 4,951,143 | 8/1990 | Waehner | 358/160 |
| 4,956,725 | 9/1990 | Kozuki | 358/335 |
| 5,016,107 | 5/1991 | Sasson | 358/906 |
| 5,018,017 | 5/1991 | Sasaki | 358/209 |
| 5,040,068 | 8/1991 | Parulski | 358/909 |

Primary Examiner—James J. Groody
Assistant Examiner—Sherrie Hsia
Attorney, Agent, or Firm—Robert E. Bushnell

[57] ABSTRACT

A picture editing apparatus of a digital still video camera system includes a digital still video camera and a reproduction device which selectively controls a picture assignment address in a memory card for mixing and displaying a multiple of one or more pictures. An address generator that mixes 2 or more pictures in the same ratio generates an address to enable display of the mixed pictures and to read-out data (digital video signal) representing pictures recorded in the memory card. Therefore, it is capable of mixing pictures corresponding to the picture number recorded in a memory card as a single frame picture and displaying the mixed picture, creating new video images.

31 Claims, 11 Drawing Sheets

| ADDRESS / PICTURE | A7 A6 A5 A4 | A3 A2 A1 A0 |
|---|---|---|
| 1st Pic | 0 0 0 0 | 0 0 0 0<br>F F F F |
| 2nd Pic | 0 0 0 1 | 0 0 0 0<br>F F F F |
| 3rd Pic | 0 0 1 0 | 0 0 0 0<br>F F F F |
| 4th Pic | 0 0 1 1 | 0 0 0 0<br>F F F F |
| 5th Pic | 0 1 0 0 | 0 0 0 0<br>F F F F |
| 6th Pic | 0 1 0 1 | 0 0 0 0<br>F F F F |
| 7th Pic | 0 1 1 0 | 0 0 0 0<br>F F F F |
| 8th Pic | 0 1 1 1 | 0 0 0 0<br>F F F F |
| 9th Pic | 1 0 0 0 | 0 0 0 0<br>F F F F |
| 10th Pic | 1 0 0 1 | 0 0 0 0<br>F F F F |
| 11th Pic | 1 0 1 0 | 0 0 0 0<br>F F F F |
| 12th Pic | 1 0 1 1 | 0 0 0 0<br>F F F F |
| 13th Pic | 1 1 0 0 | 0 0 0 0<br>F F F F |
| 14th Pic | 1 1 0 1 | 0 0 0 0<br>F F F F |
| 15th Pic | 1 1 1 0 | 0 0 0 0<br>F F F F |
| 16th Pic | 1 1 1 1 | 0 0 0 0<br>F F F F | ns
PICTURE EDITING APPARATUS IN A DIGITAL STILL VIDEO CAMERA SYSTEM

BACKGROUND OF THE INVENTION

The present invention relates to a picture editing apparatus of a digital still video camera system capable of recording and reproducing, and more particularly, to a picture editing apparatus able to mix a multiple of pictures during playback.

A general digital still video camera system comprises a digital still video camera and a playback apparatus, the digital still video camera being capable of for recording and reproducing a still image by way of digital signal processing. Namely, an image of an object is photoelectrically converted through an image pickup device and then converted into digital data to be temporarily stored in a record buffer memory. Then, the information stored in the record buffer memory is recorded on a memory card.

The memory card mentioned performs the same function as that of the film of an ordinary camera. The video signal so recorded on the memory card is read out in the playback apparatus, to be temporarily stored in a reproduction buffer memory, and then converted into analog data to be displayed via a display unit. At this time, an address generator is operated by a control signal supplied from a system controller, and assigns an address for the digital video signal to be recorded on or to be reproduced from the memory card. The address generator comprises a one frame address generating circuit and a multi-picture address generating circuit for displaying one or more pictures in a frame. Accordingly, an address output from the one frame address generating circuit is selected by a control signal of the system controller, when only one picture is to be played back, while an address output from the multi-picture address generating circuit is selected when the multi-picture of one or more pictures is to be simultaneously played back on the same screen. The multi-picture address generating circuit mentioned here generates,,as is disclosed in copending U.S. patent application by Young-Man Lee and assigned to Samsung Electronics Co., Ltd., an address so that a plurality of pictures stored in the memory card can be simultaneously displayed.

Thus, the conventional digital still video camera simultaneously displays multiple pictures on a frame by way of using a multi-picture address generating circuit. Accordingly, a user can see several pictures at a glance. Each of the pictures that is displayed however, is displayed only on a separate picture screen. It is not possible to display the part of the pictures by mixing them among each other within a frame.

SUMMARY OF THE INVENTION

Accordingly, it is an object of the present invention to provide a picture editing apparatus capable of creating new video images by mixing one or more pictures during reproducing in a digital still video camera system having a digital still video camera and a playback apparatus.

To achieve the above object of the present invention, there is provided a picture editing apparatus in a digital still video camera system having a memory card for storing a digital video signal and a playback system for processing the digital video signal read out from the memory card so that it is displayed, the picture editing apparatus comprising an address generator for generating a picture assignment address and an image data address of the memory card so that at least two or more pictures are mixed and displayed through the playback system.

BRIEF DESCRIPTION OF THE DRAWINGS

FIG. 5 is an exemplary diagram of address mapping in the memory card shown in FIG. 1;

DETAILED DESCRIPTION OF THE INVENTION

The effects and features of the present invention will become clear from the following detailed description of the invention, together with the accompanying drawings.

Figure 1:
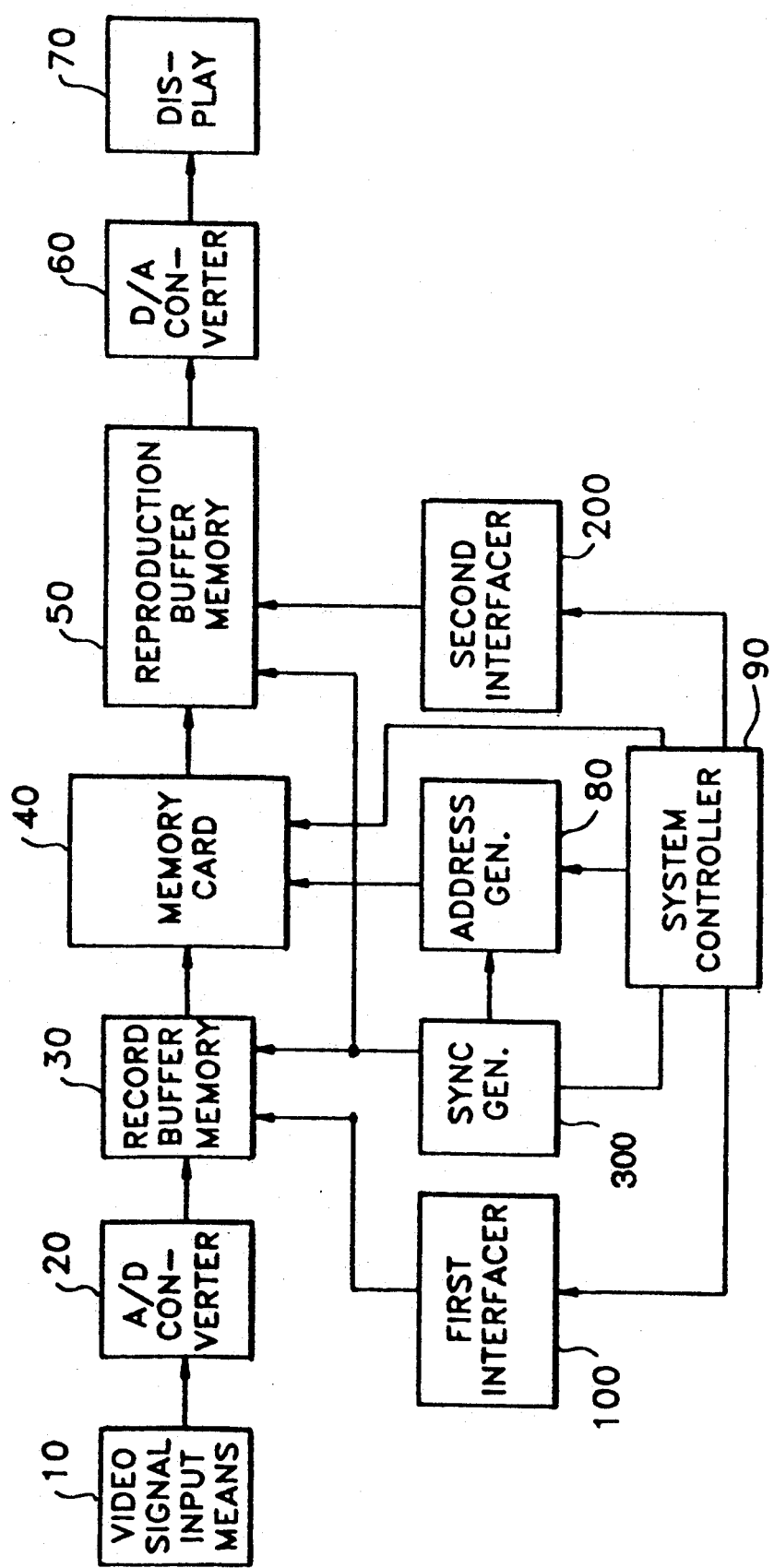
FIG. 1 is a block diagram showing one preferred embodiment of a digital still video camera system according to the present invention.

Referring to FIG. 1, a video signal input means 10 comprising a lens, an image pick-up device, etc., photoelectrically converts a still image into a video signal and supplies the converted signal to an A/D converter 20. A/D converter 20 converts the photoelectrically converted analog signal into a digital signal to supply it to a record buffer memory 30, Record buffer memory 30 stores the one frame (one picture) digital video signal by means of a control signal supplied from a first interfacer 100 and a synchronous signal generating means 300 therein. During recording, memory card 40 stores the digital video signal output from record buffet memory 30 according to an address signal supplied from address generator 80 and a write and read control signal R/W supplied from a system controller 90. During reproduction, the video signal of the assigned address is reproduced from memory card 40 according to the address signal from address generator 80 and the write and read control signal R/W, and is output to a reproduction buffer memory 50. The information supplied to reproduction buffer memory 50 is read out by the control signals supplied from synchronous signal generating means 300 and a second interfacer 200, and is output to a D/A converter 60. D/A converter 60 converts the information output from reproduction buffer memory 50 into the analog signal to supply it to a display unit 70. Display unit 70 displays the analog video signal. Here, system controller 90 controls first and second interfacers 100 and 200, synchronous signal generating means 300 and address generator 80. One output of synchronous signal generating means 300 is connected to one input of address generator 80.

Figure 2:
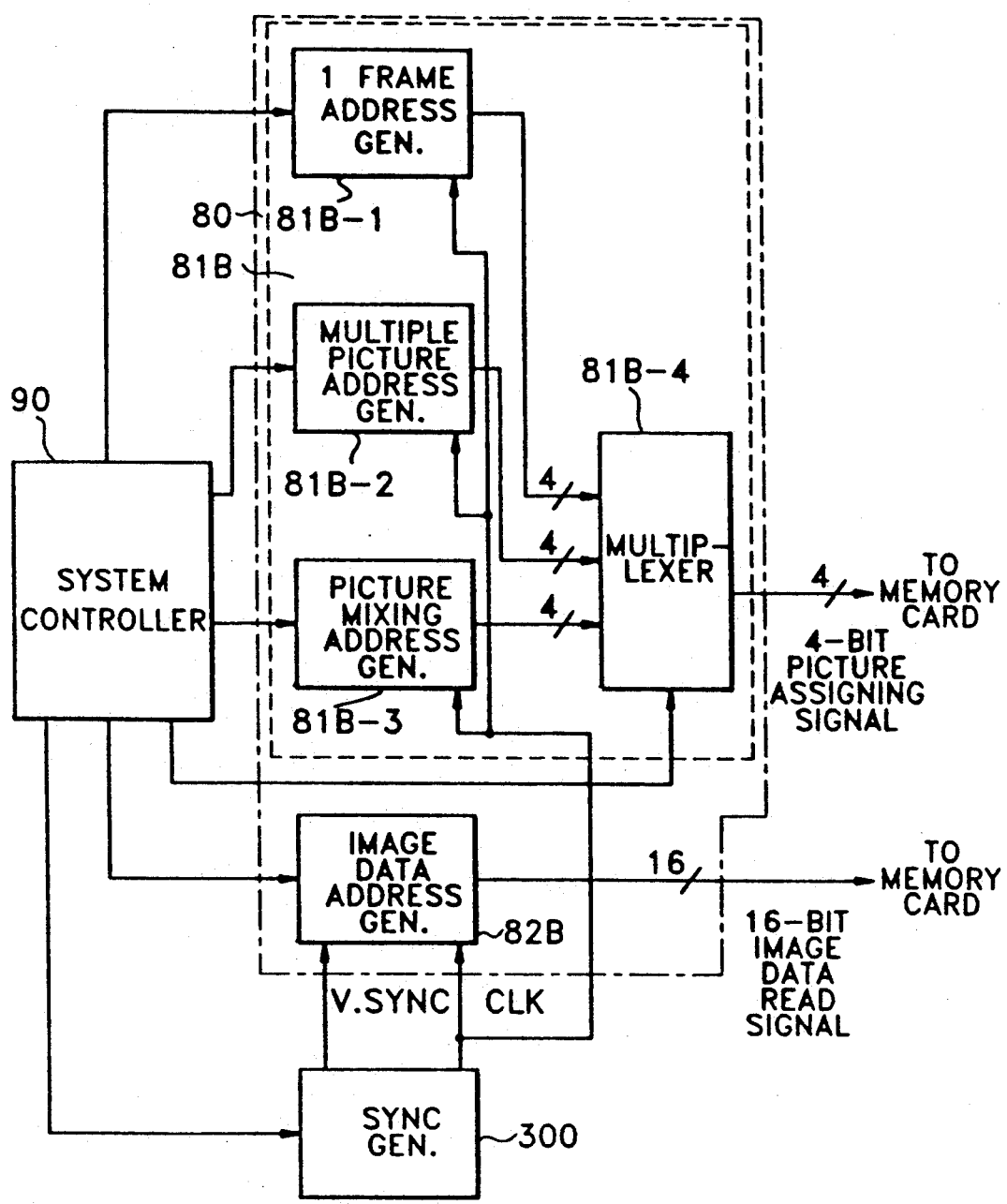
FIG. 2 is a detailed circuit diagram of the address generator as shown in FIG. 1.

FIG. 2 is a detailed block diagram of the address generator 80 shown in FIG. 1, of which the structure is given as below.

The address generator 80, shown in FIG. 2 comprises: a picture assignment address generator 81B which includes one frame address generator 81B-1, multi-picture address generator 81B-2, picture mixing address generator 81B-3 and multiplexer 81B-4, and an image data address generator 82-B. The respective input terminals of one frame address generator 81B-1, multi-picture address generator 81B-2 and picture mixing address generator 81B-3 are connected to the respective output terminals of system controller 90. The respective input terminals of multiplexer 81B-4 are connected to the respective output terminals of one frame address generator 81B-1, multi-picture address generator 81B-2 and picture mixing address generator 81B-3. The selection terminal of multiplexer 81B-4 is connected to one output terminal of system controller 90. The output terminal of multiplexer 81B-4 is connected to memory card 40. The one input terminal of image data address generator 82B is connected to another output terminal of system controller 90 and the output terminal of image data address generator 82B is connected to memory card 40.

Meanwhile, the input terminal of synchronous signal generating means 300 is connected to another output terminal of system controller 90. The vertical synchronizing signal output V.SYNC thereof is connected to an input of image data address generator 82B and clock signal output CLK thereof is connected to the respective inputs of image data address generator 82B, one frame address generator 81B-1, multi-picture address generator 81B-2 and picture mixing address generator 81B-3.

Figure 3:
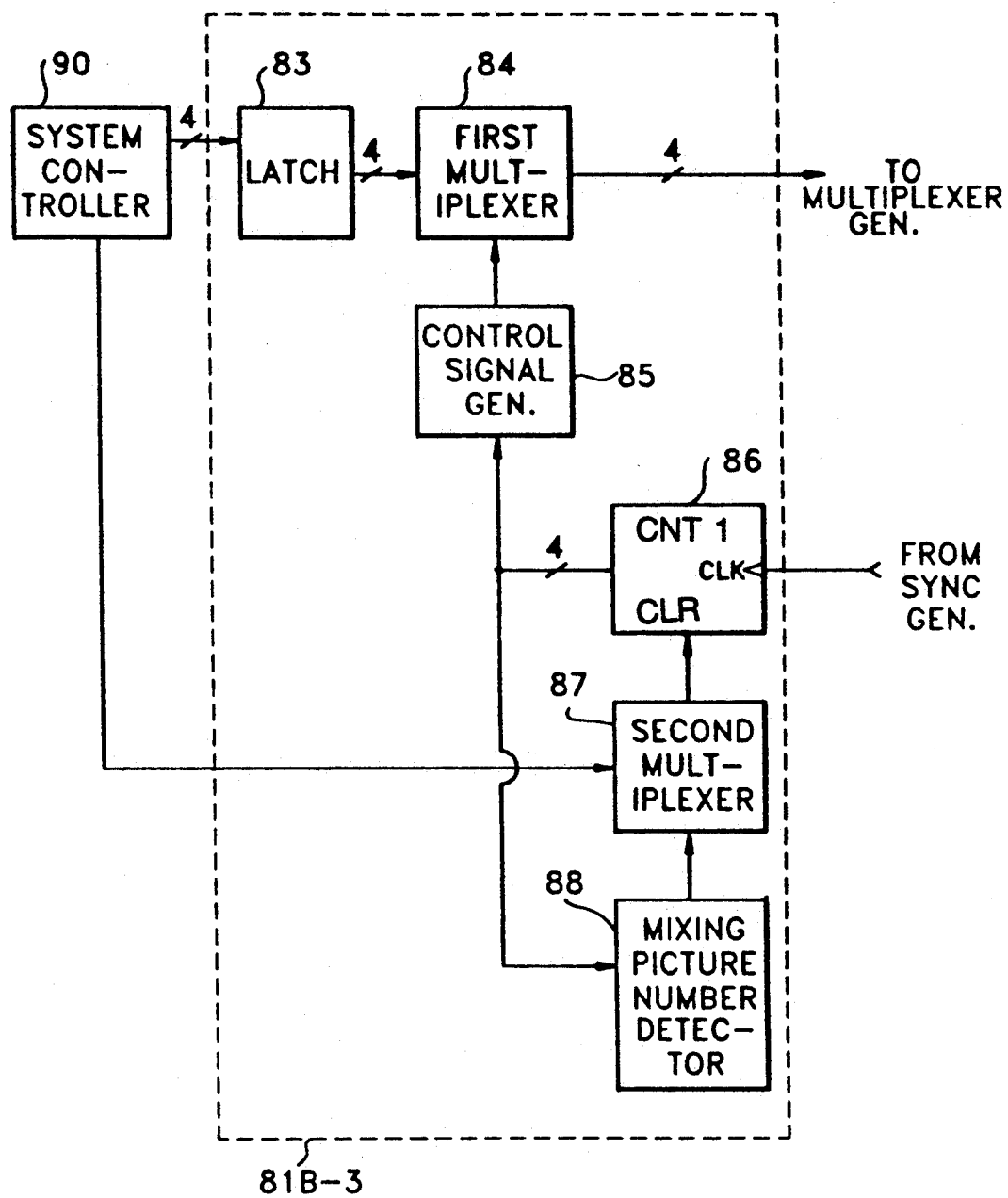
FIG. 3 is a detailed circuit diagram of a picture mixing address generator shown in FIG. 2.

FIG. 3 is a detailed block diagram of picture mixing address generator 81B-3 of FIG 2. An input of latch circuit 83 is connected to the information output for the desired pictures of system controller 90. The input of first multiplexer 84 is connected to the output of latch circuit 83 and the output thereof is connected to the input of multiplexer 81B-4. The input of first counter CNT1 86 is connected to the clock signal output CLK of synchronous signal generating means 300. The input of control signal generator 85 is connected to the output of first counter CNT1 86 and the output thereof is connected to the output signal control terminal of first multiplexer 84. The input of mixing picture number detector 88 is connected to the output of first counter CNT1 and the mixable picture number is detected. The respective inputs of second multiplexer 87 are connected to the control signal for the mixing picture number information of system controller 90 and the output signal of mixing picture number detector 88, and the output of second multiplexer 87 is connected to clear terminal CLR of first counter CNT1 86. Accordingly, first counter CNT1 is cleared based on the mixable picture number.

Figure 4A:
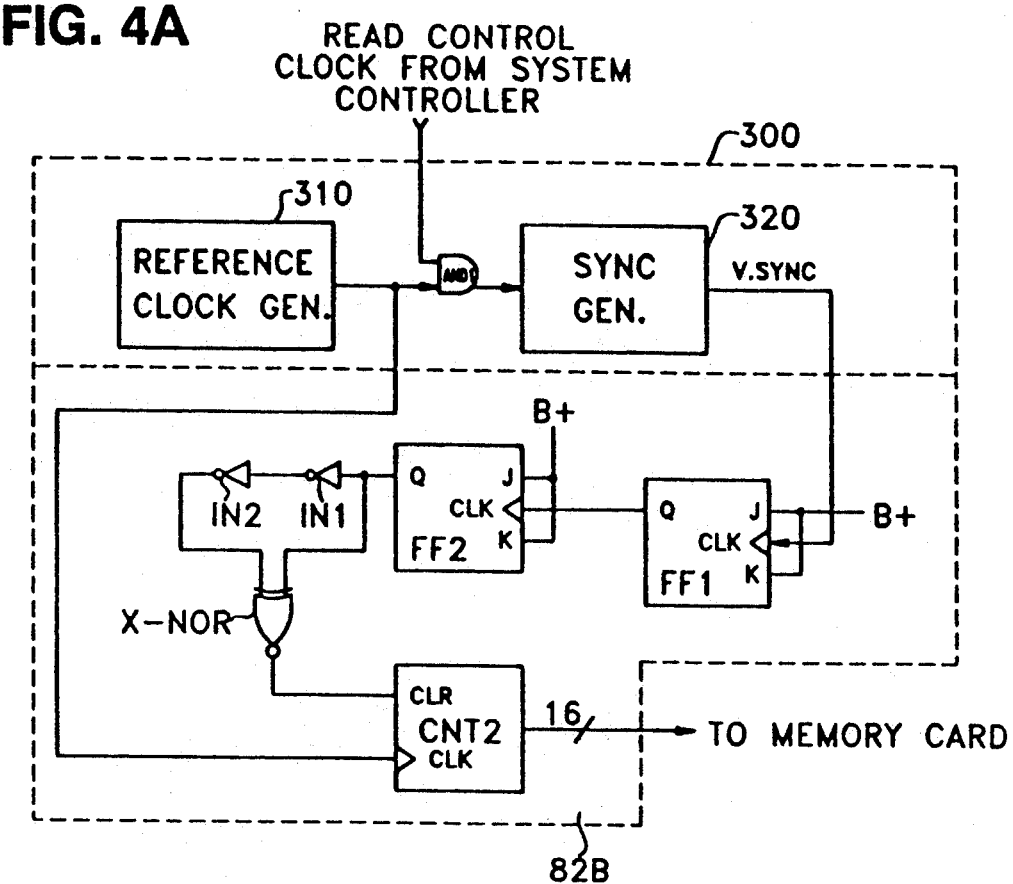
FIG. 4A is a detailed circuit diagram of the synchronous signal generating means and the image data address generating means shown in FIG. 2, and FIGS. 4B1 through 4B5 are waveform diagrams for the respective parts of the synchronous signal generating means, and image data address generating means respectively, as shown in FIG.4A.

FIG. 4A is a detailed block diagram of synchronous signal generating means 300 and image data address generator 82B of FIG.2 and is constructed as below.

The synchronous signal generating means 300 comprises a reference clock generator 310, an AND gate AND1 of which one input terminal is connected to the output of reference clock generator 310 and the other input terminal is connected to the read-out control signal output terminal of system controller 90, and a synchronous generator 320 of which the one input is connected to the output of AND gate AND1. The image data address generator 82B comprises a first flip flop FF1 whose clock input terminal is connected to the V.SYNC output terminal of synchronous generator 320, a second flip flop FF2 whose clock input terminal connects to non-inverted output terminal Q of first flip flop FF1, a first inverter IN1 whose input is connected to non-inverted output terminal Q of second flip flop FF2, a second inverter IN2 whose input is connected to the output of first inverter IN1, an exclusive NOR gate X-NOR where one input is connected to the output of the second inverter IN2 and other input is connected to non-inverted output terminal Q of second flip flop FF2, and a second counter CNT2 with a clear input terminal CLR connected to the output terminal of X-NOR and with a clock input terminal CLK connected to the output of reference clock generator 310.

FIGS. 4B1 through 4B5 show the output waveforms of the respective components shown in FIG. 4A. FIG. 4B1 is the V.SYNC output waveform of synchronous generator 320. FIG. 4B2 is the output waveform of non-inverted output terminal Q in first flip flop FF1. FIG. 4B3 is the output waveform of non-inverted output terminal Q in second flip flop FF2. FIG. 4B4 is the output waveform of second inverter IN2 and FIG.4B5 is the output waveform of exclusive NOR gate X-NOR.

FIG. 5, as an example, shows address assignment relationships for a total of 16 pictures for forming addresses in memory card 40 of FIG. 1. The upper 4 bits A7A6A5A4 are picture assignment address bits and the lower 16 bits A3A2A1A0 are image data address bits for each picture.

Figure 6A:
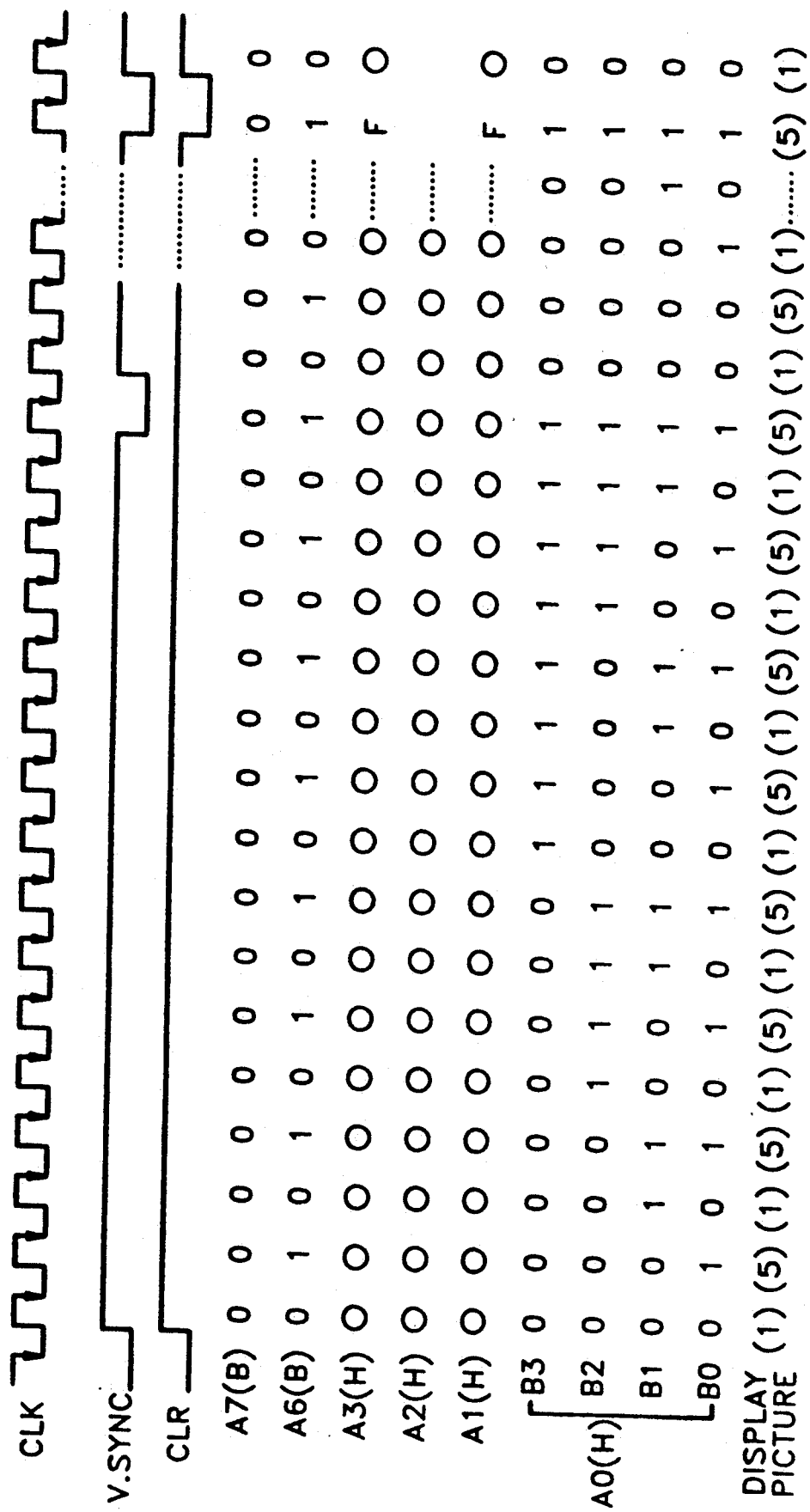
FIGS. 6A through 6C show one exemplar for editing the pictures according to FIG. 1.
Figure 6B:
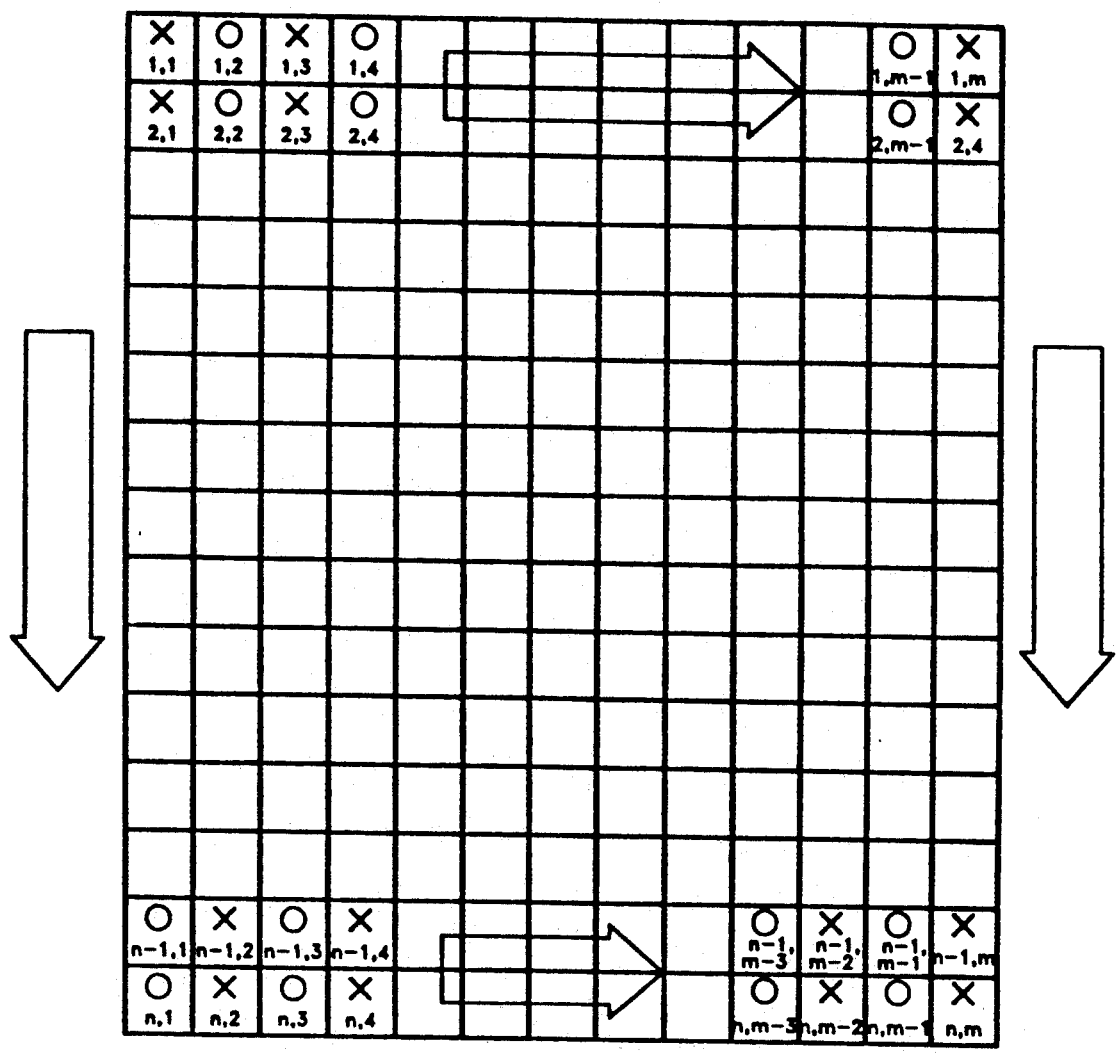
Figure 6C:
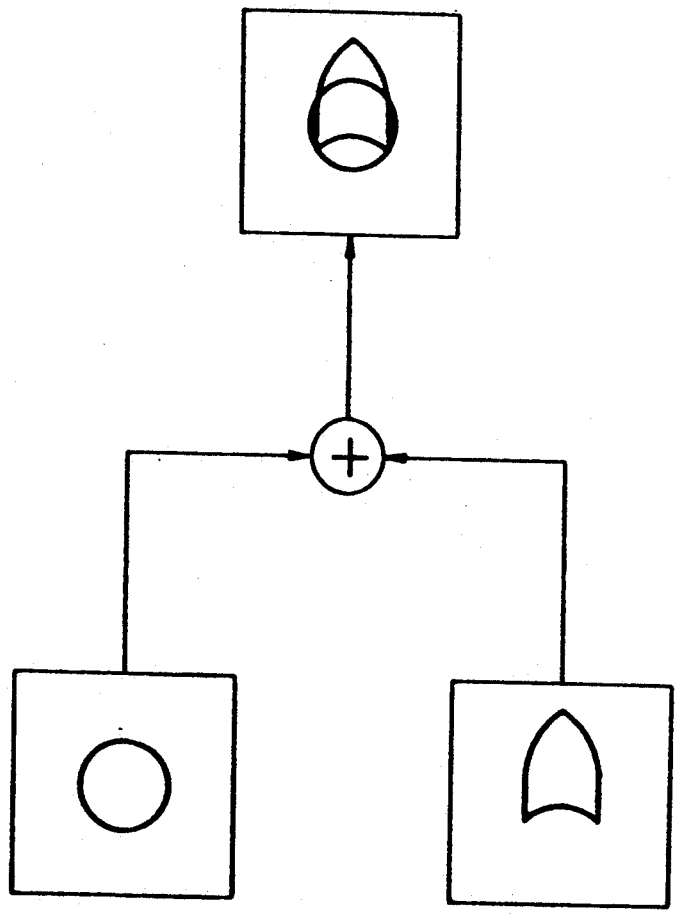

FIGS. 6A through 6C exemplify picture editing during reproduction according to FIG. 1 in the case of mixing image data of a first and fifth picture in synchronization with the V.SYNC. FIG. 6A shows a state of video signal in which a digital video signal is read from memory card 40 according to an address generated in the address generator 80 by an address assigned as in FIG. 5. FIG. 6B is a map of a recorded mixed state in reproduction buffer memory 50. FIG. 6C shows a two picture mixed condition being displayed on display unit 70.

Figure 7A:
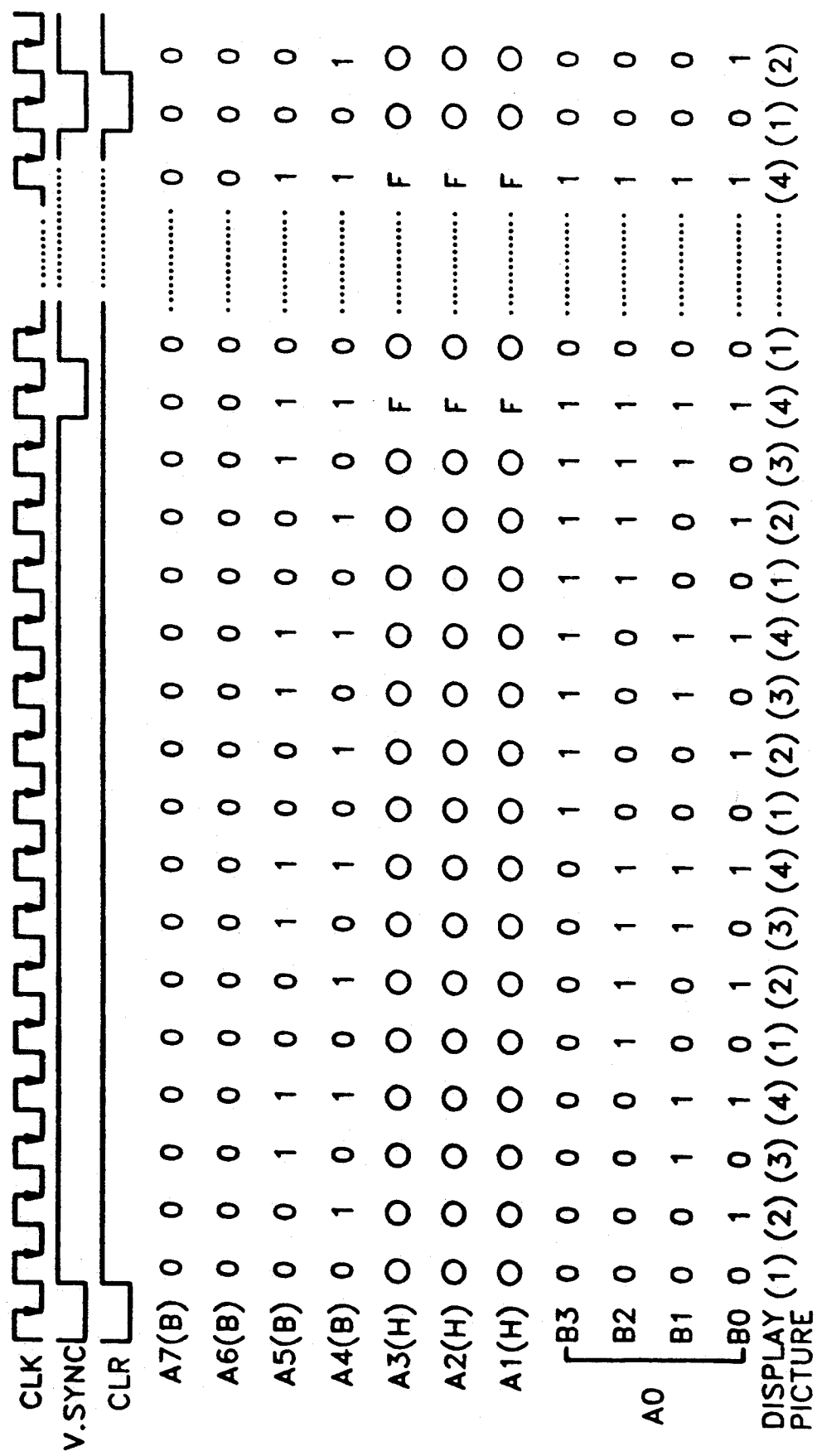
FIGS. 7A through 7C show another exemplar for editing the pictures according to FIG. 1.
Figure 7B:
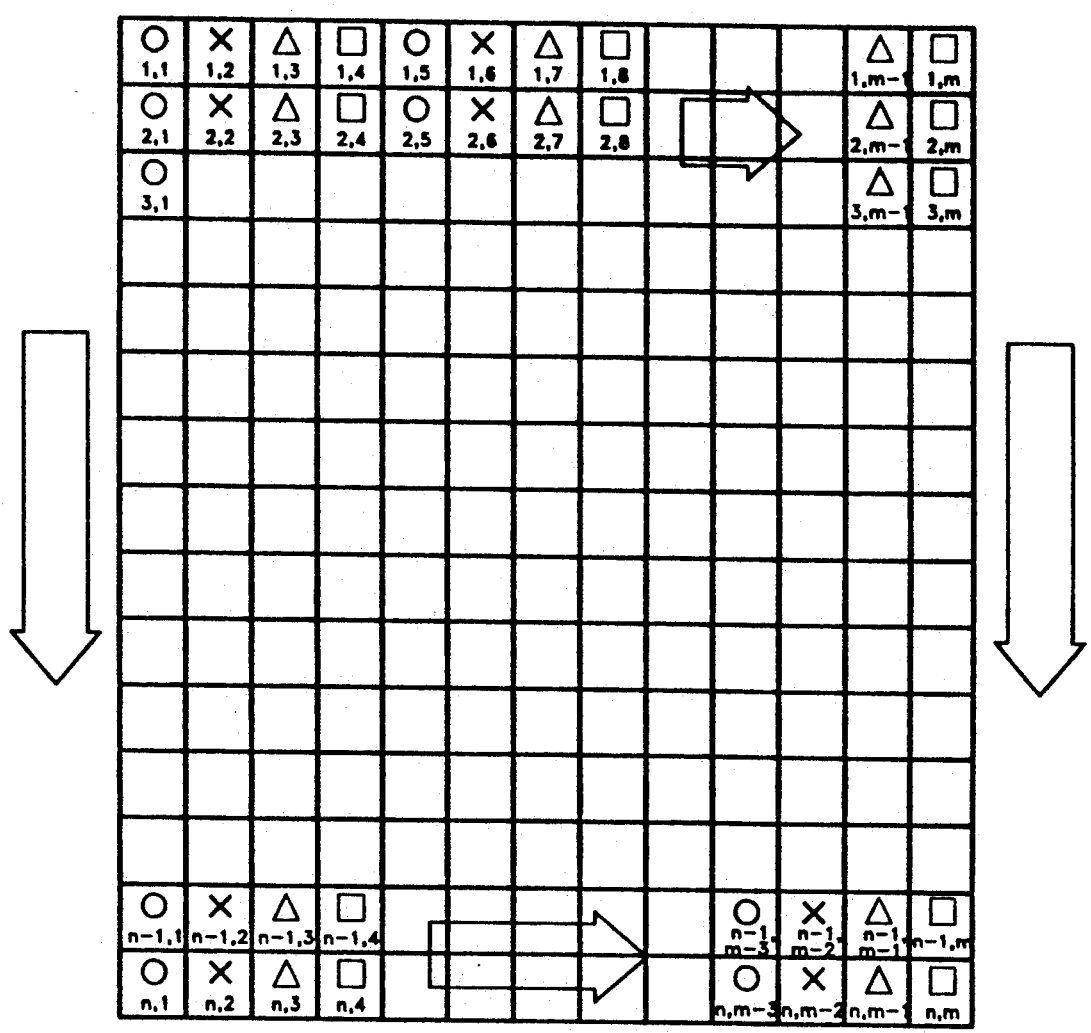
Figure 7C:
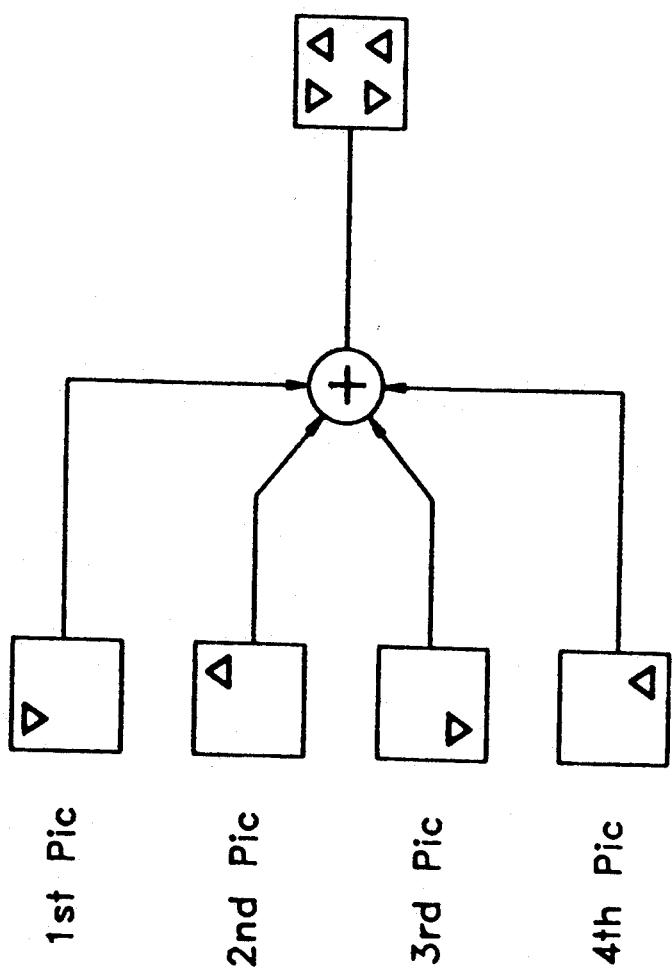

FIGS. 7A through 7C depict another example of picture editing during reproduction according to FIG. 1 in the case of mixing the first, second, third and fourth pictures. FIG. 7A shows a condition wherein a digital video signal is being read from memory card 40. FIG. 7B is a map of reproduction buffer memory 50 in a mixed condition. FIG. 7C shows a condition wherein a mix of 4 pictures is displayed on display unit 70.

A description of the operation of the preferred embodiment of a picture editing apparatus according to the present invention now follows with reference to the accompanying drawings. First, in FIG.1, since the process for recording an object image that is photographed, which is input through video signal input device 10 to a prescribed region of memory card 40, is the same as the above described, the following explanation centers about operation during reproduction. In this embodiment, it is assumed that information of 16 divided pictures is recorded in advance in memory card 40 by a record operation as shown in FIG. 5. After memory card 40 is set to a read-out mode when a control signal of a key input means or command means (not shown) is input to set an electronic camera system to the reproduction mode, system controller 90 controls to read-out desired address data among information recorded in current memory card 40, to be output to reproduction buffer memory 50 via address generator 80. Then, the desired address is set first in the command means (not illustrated) and then, the address assignment command for the desired picture read-out command is applied to system controller 90. Information that is read out and input to reproduction buffer memory 50 is recorded as a 1 frame unit through synchronous signal generating means and second interfacer 200 by a control signal of system controller 90, and after being read out and output to D/A converter 60, it is displayed on an image display unit 70. Referring to FIG. 2, the address generator 80 is made up of a picture assignment address generator 81B, wherein a picture address is generated for reading out a picture from among a plurality of pictures recorded within memory card 40 and an image data address generator 82B for generating address of video (image) data of pictures assigned by picture assignment address generator 81B. Furthermore, generator 81B, which generates addresses for picture read-out, comprises 3 kinds of picture assignment address generators: a 1 frame address generator 81B-1, multi-picture address generator 81B-2 and picture-mix address generator 81B-3.

One-frame address generator 81B-1 and multi-picture address generator 8IB-2 are used as in the conventional address generator as above described. The picture mixing address generator circuit 81B-3 is constructed as in FIG.3 to generate the addresses for selected pictures to be displayed in a mixed form by mutually superimposing a plurality of pictures.

To explain this in more detail, in FIG. 3, system controller 90 outputs the corresponding control signal to latch circuit 83 and second multiplexer 87 when the command means (not illustrated) assigns the pictures to be mixed. The latch circuit 83 comprises latching units for the number of pictures being recorded in memory card 40 and drives one latching unit per one picture set from the command means (not illustrated). Second multiplexer 87 selects a signal output from mixing picture number detector 88 as determined by a control signal input from system controller 90 for output to clear terminal CLR of first counter CNT1. As 16 pictures are recorded in memory card 40 in this embodiment, mixing picture number detector 88 must detect at least from 2 to 16 mixing picture numbers, so it has 15 gate elements corresponding to each mixing picture number. The output signal of first counter CNT1 controls the gating function of the 15 gating elements.

For instance, when the output signal of first counter CNT1 is 0001, only the gating element detecting that which is information of a 2 picture mix becomes gated and when the output signal is 0010, only the gating element detecting that which is information of a 3 picture mix is gated. Each gating element has its respective gating input signal condition and among the 15 gate elements, only one at any given time outputs a high logic.

Second multiplexer 87 cleats first counter CNT1 when select control signals being input from mixing picture number detector 88 and system controller 90 are the same. Specifically, in the case of a 2-picture mix for instance, second multiplexer 87 links the gating element corresponding to a 2 picture mix of the mixing picture number detector 88 and clears first counter CNT1 whenever the output of the gating element is a high logic state. First counter CNT1 counts the clock signal output from synchronous signal generating means 300 and supplies a 4 bit output signal to the control signal generator 85 and mixing picture number detector 88.

The control signal generator 85 comprises 15 gating elements similarly to mixing picture number detector 88. However, the output of the control signal generator 85 is input to first multiplexer 84 to control the output of the picture address information output from latch circuit 83. For instance, in setting a 2-picture mix, a control signal is output, causing address information about the digital video signals of a first picture and another picture to be output by turns before the first counter CNT1 is cleared again. Control signal generator 85 controls first multiplexer 84 to transfer the output of latch circuit 83 to multiplexer 81B-4.

The 3 kinds of usage circuits within the picture assignment address generator 81B synchronize an address signal, which is generated by a control signal of system controller 90 in response to respective commands that are input from the command means (not illustrated), to a clock signal output from synchronous signal generating means 300 and the output thereof is input to 3 input terminals of multiplexer 81B-4 via a 4 bit address bus. However, the addresses are not simultaneously input to the 3 input terminals at this time. That is because only the address of the usage circuit selected in advance from among the 3 usage circuits is applied to the input terminal of multiplexer 81B-4. Multiplexer 81B-4 selects a path to connect the 3 input terminals and its one output terminal as determined by a select control signal input from system controller 90 so the address signal being input to said input terminal is output. For example, when a control signal being input from system controller 90 to select terminal of multiplexer 81B-4 is 100, multiplexer 8IB-4 selects and outputs the signal output from 1-frame address generator 8IB-1. When 010, multiplexer 81B-4 selects and outputs the signal output from multi-picture address generator 81B-2. When 001, multiplexer 81B-4 selects and outputs the signal output from picture mixing address generator 81B-3. The signal output from multiplexer 81B-4 is input to memory card 40 to assign the read-out picture.

When a picture is assigned under the control signal from system controller 90, the image data address generator 82B outputs an address that corresponds to a 1 pixel unit to memory card 40 in order to read-out data (a digital video signal) that corresponds to a picture. Then, the address assignment of the picture data becomes synchronized to a vertical synchronous signal of synchronous signal generating means 300 and the clock signal. That is, as can be seen in FIGS. 4A and 4B, a regular reference clock signal is generated by self-oscillation occurring in reference clock generator 310 located within synchronous signal generating means 300.

AND gate AND1 inputs a reference clock signal to synchronous generator 320 only when the control signal input from system controller 90 is at a high logic state. Then, the control signal of system controller 90 and the read-out mode control signal of memory card 40 are the same. Sync generator 320 outputs vertical and horizontal sync signals synchronized to the rising edge of the clock signal. Among these, a clock signal from reference clock generator 310 and vertical synchronous sync signal V.SYNC from synchronous signal generator 300 become input to the image data address generator 82B. The vertical synchronous signal that is input is as shown in FIG. 4B1. The vertical synchronous signal shown in FIG. 4B1 is input to a clock input terminal CLK of first flip flop FF1 being a JK flip flop, and output through non-inverted output terminal Q as a waveform shown in FIG. 4B2. The output signal is input to the clock input terminal CLK of second flip flop FF2 being a JK flip flop and output as a waveform as shown in FIG. 4B3 through non-inverted terminal Q. The output signal is delayed as much as the vertical blanking time through first and second inverters IN1 and IN2 as shown in FIG. 4B4 and input to one input terminal of exclusive NOR gate X-NOR. A signal that is output from the above described second flip flop is input to the other input terminal of the exclusive NOR gate X-NOR, as shown in FIG.4B3. The logic of the exclusive NOR gate X-NOR outputs a high logic state only when the logic of the two input signals are the same (1 or 0). Therefore, a waveform as in FIG. 4B5 is output to clear terminal CLR of second counter CNT2. Second counter CNT2 is cleared by a signal input to its clear terminal CLR and becomes counted and synchronized by the clock signal output from the above described reference clock generator 310 to output an assigned address of picture data (16 bits: B0-B15) to memory card 40 during reproduction.

FIG.5 shows a memory address structure for memory card 40, wherein picture selection is formed of an address map that assigns selectively in the upper bits A7A6A5A4. For instance, when assigned bits set as A7A6A5A4 is 1001, it is the 10th picture and when 0100, it is assigned to be the 5th picture. In addition, the lower bits A3A2A1A0 form an image data address of a corresponding picture, so as to be synchronized to a V.SYNC generated in synchronous signal generating means 300 and read out from memory card 40. For instance, when the first picture is desired to be displayed, A7A6A5A4 is output as 0000 and when the 16 bit data (0000-FFFFH) of A3-A0H is synchronized to the V.SYNC and read-out, data of the first picture is read-out and sent to a reproduction buffer memory 50. At this time, in the case of selecting one picture, the location in address generator 80 where the picture assignment address is output is 1 frame address generator circuit 81B-1.

However, in the case of mixing several pictures as in FIGS. 6A through 6C and 7A through 7C, an address output from the picture mixing address generator 81B-3 is applied to memory card 40, Referring to FIGS.6A through 6C, first, in the reference clock signal generator 310 of the synchronous signal generating means 300, a clock signal CLK of FIG.6A is output in order to display the image data of first and fifth pictures through a display unit 70. Sync generator 320 generates one pulse per each frame as the V.SYNC in accordance with clock signal CLK as shown in FIG. 6A. A clear signal CLR which generates 1 pulse for each frame as shown in FIG.6A, is applied to the second counter CNT2 by the clock signal CLK and V.SYNC. Therefore, second counter CNT2 becomes cleared by each frame, synchronized to the clock signal CLK and outputs image data addresses (B0-B15) for memory card 40 from the start point when the vertical blanking period of the V.SYNC ends., as shown in FIG. 6A (A3A2A1A0; 4 bits×4=16 bit=B0-B15). In the meantime, the address A7A6A5A4 output from the picture mixing address generator 81B-3 repeatedly outputs a first picture address 0000 and a fifth picture address 0100 in turns as assigned addresses, at each clock time period (A7A6 of FIG. 5). Image data that is output from memory card 40 to reproduction memory buffer 50 by read-out of the assigned address is in the form of a memory map structure indicated by FIG. 6B. This memory map is information corresponding to 1 frame. FIG. 6C shows a picture mixed through a mixer assuming that the circle of the upper picture is information of the first picture and the OR gate shape of the lower picture is information of a fifth picture.

As an example of mixing fast, second, third, and fourth pictures in FIGS. 7A through 7C, the mixing method is the same as described in FIGS.6A through 6C. A7A6A5A4, being the only picture assignment bits, are repetitively output in turns as one of the values 0000, 0001, 0010, and 0011 each clock period. FIG. 7B shows a memory map recorded in reproduction buffer memory 50 in accordance with this and shown in FIG. 7C is a picture mix of 4 separate pictures mixed according to the above described method. Selectively controlling the addresses of pictures recorded in a memory card and displaying a plurality of pictures is possible.

As described above, by selectively controlling the picture assignment address on a memory card in order to mix and display one or more pictures in a picture editing apparatus of an digital still video camera system comprising a digital still video camera and a reproduction device, the pictures corresponding to the numbers of the pictures stored in the memory card can be mixed and displayed in a single frame, thereby creating new images.

What is claimed is:

1. A picture editing apparatus in a digital still video camera system, comprising:
   means for storing a plurality of digital signals in frames in a memory card;
   means for processing said digital video signals read-out from said memory card;
   image data address generator means for generating image data addresses of said memory card;
   one frame address generator means for generating a first picture assignment address of said memory card for one picture per each frame;
   multi-picture address generator means for generating second picture assignment addresses of a specified number of pictures recorded in said memory card; and
   picture mixing address generator means for generating third picture assignment addresses for selected pictures by mutually mixing a plurality of said selected pictures.

2. The picture editing apparatus as claimed in claim 1, further comprising synchronous signal generator means for controlling a time period of said image data addresses to be common to said storing and processing means.

3. The picture editing apparatus as claimed in claim 2, wherein said first picture assignment address, said second picture assignment addresses and said third picture assignment addresses become synchronized to a clock signal from said synchronous signal generator means.

4. The picture editing apparatus as claimed in claim 3, further comprising system control means for controlling said one frame address generator means, said multi-picture address generator means, said picture mixing address generator means and said synchronous signal generator means.

5. The picture editing apparatus as claimed in claim 4, further comprising selection means for alternately selecting said first, second and third picture assignment addresses in dependence upon a display mode of said picture editing apparatus.

6. The picture editing apparatus as claimed in claim 5, wherein said picture mixing address generator means comprises:
   latch means controlled by said system control means, for alternately selecting said third picture assignment addresses;
   control signal generator means for generating a control signal to synchronize said third picture assignment addresses to a clock signal of said synchronous signal generator means; and
   transfer means for transferring said third picture assignment addresses to said selection means.

7. The picture editing device as claimed in claim 6, wherein said picture mixing address generator further comprises:
   mixing picture number detection means for detecting a mixing picture number according to a counting of said clock signal, to generate a detected mixing number signal; and
   control means for selecting said detected mixing number signal in response to a picture mixing control signal from said system control means, and for controlling a counting period of said clock signal in accordance with said detected mixing number signal.

8. The picture editing apparatus as claimed in claim 5, wherein each of said image data addresses corresponds to pixel data of one of said digital video signals of a picture corresponding to said first, second and third picture assignment addresses.

9. The picture editing apparatus as claimed in claim 5, wherein said selection means comprises a multiplexer.

10. The picture editing apparatus as claimed in claim 6, wherein said image data address generator means comprises:
    reference signal counting means for generating an one frame reference signal by using a double counting stage when a vertical synchronous signal from said synchronous signal generator means is received;
    logic means for shaping a pulse in conjunction with said one frame reference signal to generate a shaped reference signal; and
    address counting means for generating a counting result of one of said image data addresses in conjunction with said clock signal received from said synchronous signal generator means and said shaped reference signal.

11. The picture editing apparatus as claimed in claim 8, wherein said selection means comprises a multiplexer.

12. A picture editing apparatus used in a still video camera for mixing a multiple of pictures during a reproduction mode, said picture editing apparatus comprising:
    memory means for storing a plurality of digital video signals by frames, each of said plurality of digital video signals representing a picture;
    reproduction buffer memory means for receiving said plurality of digital video signals from said memory means;
    one frame address generation means for generating a first picture assignment address signal when only one of said plurality of digital video signals is to be written from said memory means to said reproduction buffer memory means;
    multiple picture address generation means for generating a second picture assignment address signal when a multiple of digital video signals are to be written from said memory means to said reproduction buffer memory means;
    picture mixing address generation means for generating a third picture assignment address signal when a number of said plurality of digital video signals are to be mixed by superimposition;
    image data address generation means for generating an image data address signal representing addresses, in pixels, of picture data to be written to said reproduction buffer memory means synchronization generation means;
    for synchronizing the mixing of said number of said plurality of digital video signals by generating a clock signal; and
    first multiplexing means for enabling transmission of one of said first, second and third picture assignment address signals.

13. The picture editing apparatus as claimed in claim 12, wherein said picture mixing address generation means comprises:
    first counting means for generating a counted synchronization signal by making counts of said clock signal from said synchronization generation means;
    latch means for alternately transmitting picture assignment addresses to generate said third picture assignment address signal;
    control signal generation means for synchronizing said third picture assignment address signal with said clock signal by generating a synchronizing signal in response to said counted synchronization signal;
    second multiplexing means for enabling transmission of said third picture address signal in response to said synchronizing signal;
    mixing picture number detection means for detecting numbers of pictures to be mixed based on said counted synchronization signal to generate a detected picture number signal; and
    third multiplexing means for selectively enabling transmission of said detected picture number signal, and for clearing said counts for said first counting means.

14. The picture editing apparatus as claimed in claim 13, wherein said latch means comprises a plurality of latches, each of said latches corresponding to one of said pictures stored in said memory means.

15. The picture editing apparatus as claimed in claim 13, wherein said mixing picture number detection means has a plurality of gates, a total number of gates being one less than a total number of pictures stored in said memory means, each of said gates corresponding to a picture mixing number.

16. The picture editing apparatus as claimed in claim 15, wherein said control signal generation means comprises a plurality of gates, a total number of gates of said control signal generation means equal to the total number of gates of said mixing picture number detection means.

17. The picture editing apparatus as claimed in claim 13, further comprising said third multiplexing means clearing said first counting means when said detected picture number signal is substantially the same as a selection control signal from a system controller.

18. The picture editing apparatus as claimed in claim 13 wherein said synchronization generation means comprises:
    reference clock generation means for generating said clock signal; and synchronization generator means for generating horizontal and vertical synchronous signals synchronized with said clock signal.

19. The picture editing apparatus as claimed in claim 16, wherein said synchronization generation means comprises:
reference clock generation means for generating said clock signal; and
synchronization generator means for generating horizontal and vertical synchronous signals synchronized with said clock signal.

20. The picture editing apparatus as claimed in claim 13, wherein said image data address generation means comprises:
reference signal counting means for generating an one frame reference signal by double counting a vertical synchronous signal received from said synchronization generation means;
logic means for shaping said one frame reference signal to generate a shaped one frame reference signal;
second counting means for counting said clock signal in conjunction with said shaped one frame reference signal to generate said image data address signal.

21. The picture editing apparatus as claimed in claim 20, wherein said logic means comprises:
delay means for delaying said one frame reference signal; and
a logic gate for receiving said one frame reference signal and said delayed signal to generate said shaped one frame reference signal.

22. The picture editing apparatus as claimed in claim 19, wherein said image data address generation means comprises:
reference signal counting means for generating an one frame reference signal by double counting said vertical synchronous signal;
logic means for shaping said one frame reference signal to generate a shaped one frame reference signal; and
second counting means for counting said clock signal in conjunction with said shaped one frame reference signal to generate said image data address signal.

23. The picture editing apparatus as claimed in claim 22, wherein said logic means comprises:
delay means for delaying said one frame reference signal; and
a logic gate for receiving said one frame reference signal and said delayed signal to generate said shaped one frame reference signal.

24. A method of editing pictures in a digital still video camera having a memory means storing pictures by frames, said method comprising:
alternatively selecting to read out from the memory means to a frame of a reproduction buffer, only one picture, a plurality of pictures with each picture occupying a distinct region of the frame of the reproduction buffer, and a plurality of pictures mutually superimposed in the frame of the reproduction buffer;
generating a picture address for reading out a picture stored in the memory means if selecting to read out said plurality of pictures mutually superimposed in the frame of the reproduction buffer;
generating an image data address corresponding to image data of the picture being read out if selecting to read out said plurality of pictures mutually superimposed in the frame of the reproduction buffer; and
writing the image data to the reproduction buffer.

25. A method of editing pictures in a digital still video camera having memory means storing pictures by frames, said method comprising:
alternatively selecting to read out from the memory means to a frame of a reproduction buffer, only one picture, a plurality of pictures with each picture occupying a distinct region of the frame of the reproduction buffer, and a plurality of pictures mutually superimposed in the frame of the reproduction buffer;
counting a clock signal using a counter to generate a counted signal if selecting to read out said plurality of pictures mutually superimposed in the frame of the reproduction buffer;
detecting a number of pictures in the memory means to be mixed;
clearing the counter after read out of image data from the memory means is complete;
driving a latching unit for each picture set to be mixed;
controlling the output of each latching unit in dependence upon said counted signal;
generating an image data address corresponding to image data of the picture being read out if selecting to read out said plurality of pictures mutually superimposed in the frame of the reproduction buffer; and
writing the image data to the reproduction buffer.

26. The method as claimed in claim 24, wherein said step of generating an image data address comprises:
generating a clock signal;
generating a synchronous signal in response to said clock signal and a read control signal from a system controller;
counting a predetermined number of pulses of said synchronous signal to generate a counting signal;
delaying said counting signal to generate a delayed signal;
gating said delayed signal with said counting signal to generate a clearing signal; and
counting said clock signal in dependence upon said clearing signal to generate said image data address.

27. The method as claimed in claim 25, wherein said step of generating an image data address comprises:
generating a clock signal;
generating a synchronous signal in response to said clock signal and a read control signal from a system controller;
counting a predetermined number of pulses of said synchronous signal to generate a counting signal;
delaying said counting signal to generate a delayed signal;
gating said delayed signal with said counting signal to generate a clearing signal; and
counting said clock signal in dependence upon said clearing signal to generate said image data address.

28. A picture editing apparatus used in a still video camera for mixing a multiple of pictures during a reproduction mode, said picture editing apparatus comprising:
memory means for storing a plurality of digital video signals by frames, each of said plurality of digital video signals representing a picture;

reproduction buffer memory means for receiving said plurality of digital video signals from said memory means;

picture mixing address generation means for generating a picture assignment address signal indicating locations of said multiple of pictures stored in said memory means, when a number of said plurality of digital video signals are to be mixed by superimposition;

image data address generation means for generating an image data address signal representing addresses, in pixels, of picture data to be written to said reproduction buffer memory means; and synchronization generation means for synchronizing the mixing of said number of said plurality of digital video signals by generating a clock signal.

29. The picture editing apparatus as claimed in claim 28, wherein said picture mixing address generation means comprises:

first counting means for generating a counted synchronization signal by making counts of said clock signal from said synchronization generation means;

latch means for alternately transmitting picture assignment addresses to generate said picture assignment address signal;

control signal generation means for synchronizing said picture assignment address signal with said clock signal by generating a synchronizing signal in response to said counted synchronization signal;

first multiplexing means for enabling transmission of said picture assignment address signal in response to said synchronizing signal;

mixing picture number detection means for detecting numbers of pictures to be mixed based on said counted synchronization signal to generate a detected picture number signal; and second multiplexing means for selectively enabling transmission of said detected picture number signal, and for clearing said counts for said first counting means.

30. The picture editing apparatus as claimed in claim 29 wherein said image data address generation means comprises:

reference signal counting means for generating an one frame reference signal by double counting a vertical synchronous signal received from said synchronization generation means;

logic means for shaping said one frame reference signal to generate a shaped one frame reference signal; and second counting means for counting said clock signal in conjunction with said shaped one frame reference signal to generate said image data address signal.

31. The picture editing apparatus as claimed in claim 29 wherein said synchronization generation means comprises:

reference clock generation means for generating said clock signal; and synchronization generator means for generating horizontal and vertical synchronous signals synchronized with said clock signal.

* * * * *

UNITED STATES PATENT AND TRADEMARK OFFICE
CERTIFICATE OF CORRECTION

PATENT NO. : 5,301,026
DATED : April 5, 1994
INVENTOR(S) : Young-man Lee

It is certified that error appears in the above-indentified patent and that said Letters Patent is hereby corrected as shown below:

| Column 1, | Line 36, | After "controller", Delete comma ",";  |
| | Line 41, | After "generates", Delete one comma ",";  |
| | Line 52, | After "separate", Insert --part of the--; |
| Column 3, | Line 57, | After "CNT1", Insert --86--; |
| Column 5, | Line 47, | After "mixing", Delete "picture"; |
| | Line 59, | Change "cleats", to --clears--; |
| Column 7, | Line 45, | After "40", Change "," to --.--; |
| | Line 60, | After "V.SYNC ends", Delete ".". |

Signed and Sealed this

Fourth Day of October, 1994

Attest:

BRUCE LEHMAN

Attesting Officer        Commissioner of Patents and Trademarks